US008411055B2

(12) United States Patent
Cheng et al.

(10) Patent No.: US 8,411,055 B2
(45) Date of Patent: Apr. 2, 2013

(54) PORTABLE ELECTRONIC DEVICE

(75) Inventors: Yung-Fa Cheng, Taipei Hsien (TW); Hsiang-Lung Kao, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 323 days.

(21) Appl. No.: 12/768,534

(22) Filed: Apr. 27, 2010

(65) Prior Publication Data

US 2011/0074709 A1 Mar. 31, 2011

(30) Foreign Application Priority Data

Sep. 28, 2009 (CN) .......................... 2009 1 0307853

(51) Int. Cl.
*G06F 3/041* (2006.01)

(52) U.S. Cl. .............. 345/173; 361/679.01; 361/679.02; 379/428.01

(58) Field of Classification Search .................. 455/566, 455/575.1–575.3; 345/173; 379/428.01
See application file for complete search history.

(56) References Cited

U.S. PATENT DOCUMENTS

| 5,646,818 | A  | * | 7/1997  | Hahn ....................... | 361/679.09 |
| 6,384,811 | B1 | * | 5/2002  | Kung et al. .................. | 345/168 |
| 7,418,275 | B2 | * | 8/2008  | Yiu ............................... | 455/566 |
| 8,024,019 | B2 | * | 9/2011  | Miyaoka .................... | 455/575.4 |
| 8,051,980 | B2 | * | 11/2011 | Tai et al. ....................... | 206/320 |

FOREIGN PATENT DOCUMENTS

CN 1710510 A 12/2005

* cited by examiner

*Primary Examiner* — Alexander Eisen
*Assistant Examiner* — Robin Mishler
(74) *Attorney, Agent, or Firm* — Altis Law Group, Inc.

(57) ABSTRACT

A portable electronic device includes a main body including a housing, a display electrically connected to the main body, and a frame for connecting between the main body and the display. The display includes a display panel and a carrier for carrying the display panel. The portable electronic device is capable of being operated to switch between a closed state and an open state. When the portable electronic device is in the closed state, the display covers the main body with either one of the display panel or the carrier facing the housing of the main body, and the main body and the display are surrounded by the frame. When the portable electronic device is in the open state, the main body is straddled by the frame and is supported by the frame to define a first predetermined angle between the main body and the frame.

6 Claims, 11 Drawing Sheets

PORTABLE ELECTRONIC DEVICE

BACKGROUND

1. Technical Field

The present disclosure relates to portable electronic devices, and particularly to a portable electronic device having an adjustable display.

2. Description of Related Art

Generally, a portable electronic device, such as a notebook computer, or a media player, includes a main body for accommodating core components, a hinge, and a display pivotally connected to the main body by the hinge. When using the portable electronic device, the hinge can provide friction to secure the display in order for the display to remain steady and not inadvertently rotate while being viewed. However, the friction provided by the hinge may weaken, after repeated use and this may cause it to be unsteady while being viewed.

Therefore, what is needed is to provide a portable electronic device, which can address the problem described above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the eleven views.

DETAILED DESCRIPTION

Figure 1:
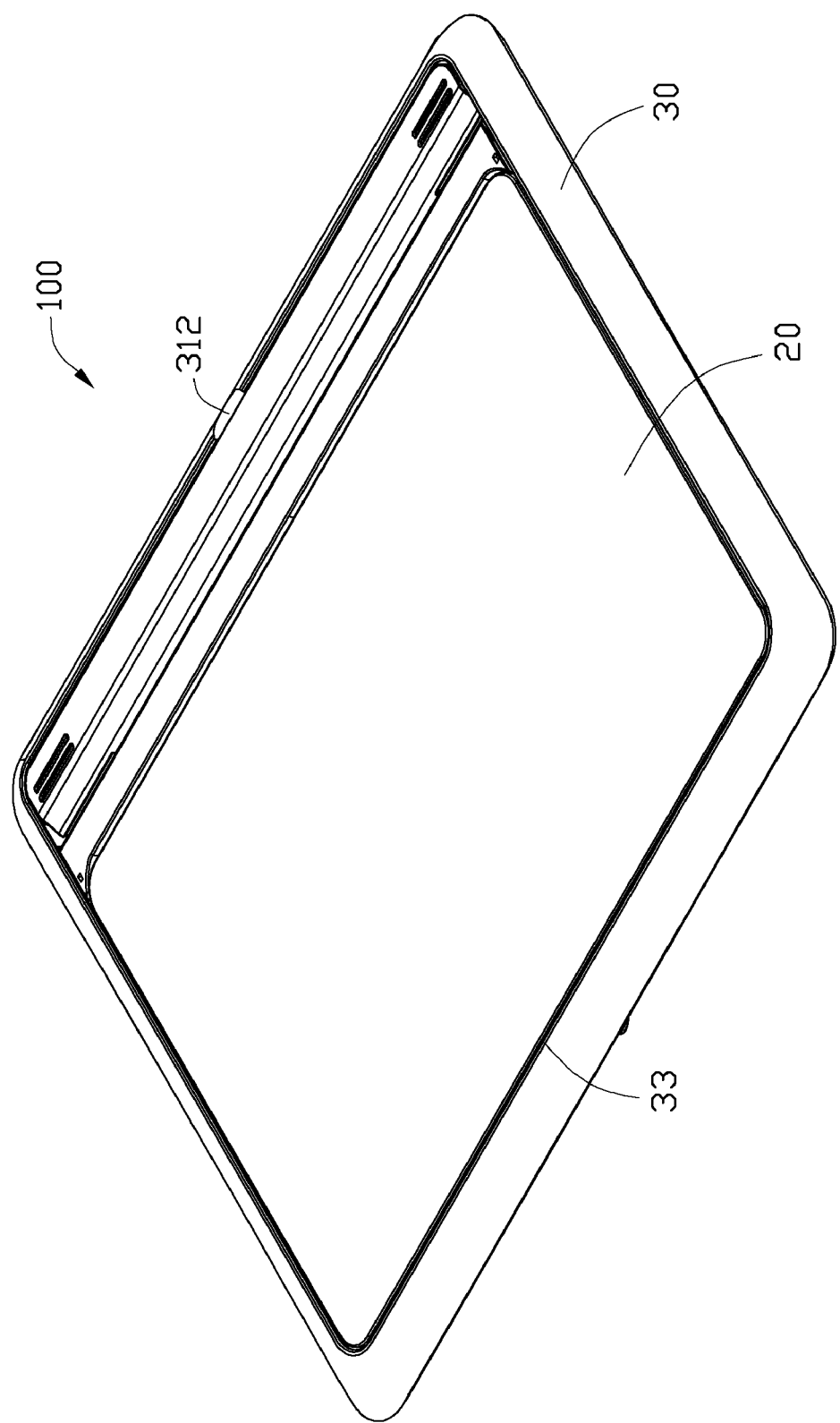
FIG. 1 is an isometric view of a portable electronic device in a first closed state, including a main body, a display, and a frame for rotatablely connecting the main body to the display, in accordance with an exemplary embodiment.
Figure 2:
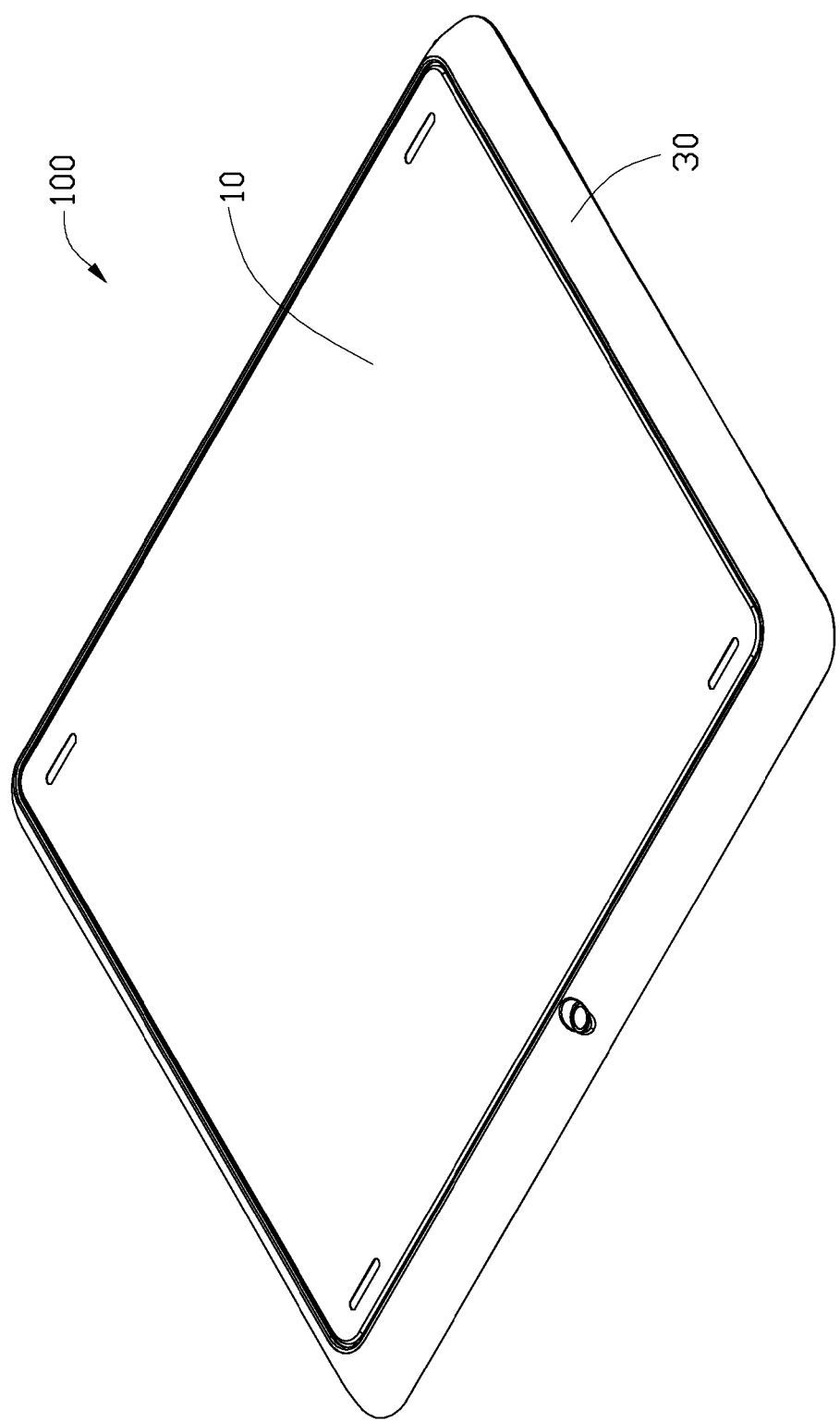
FIG. 2 is similar to FIG. 1, but showing the portable electronic device from another angle.

Referring to FIGS. 1 and 2, a portable electronic device 100 according to an exemplary embodiment is illustrated. In this embodiment, the portable electronic device 100 is a notebook computer. The portable electronic device 100 includes a main body 10, a display 20, and a frame 30 for rotatablely connecting the main body 10 to the display 20.

When the portable electronic device 100 is in a first closed state as shown in FIGS. 1 and 2, the main body 10 is parallel with a supporting plane (not shown), such as a desk. The display 20 covers the main body 10. The main body 10 and the display 20 are surrounded by the frame 30. The display 20 covers the main body 10 with a display panel 21 (see FIG. 3) of the display 20 facing a housing 19 (see FIG. 3) of the main body 10.

Figure 3:
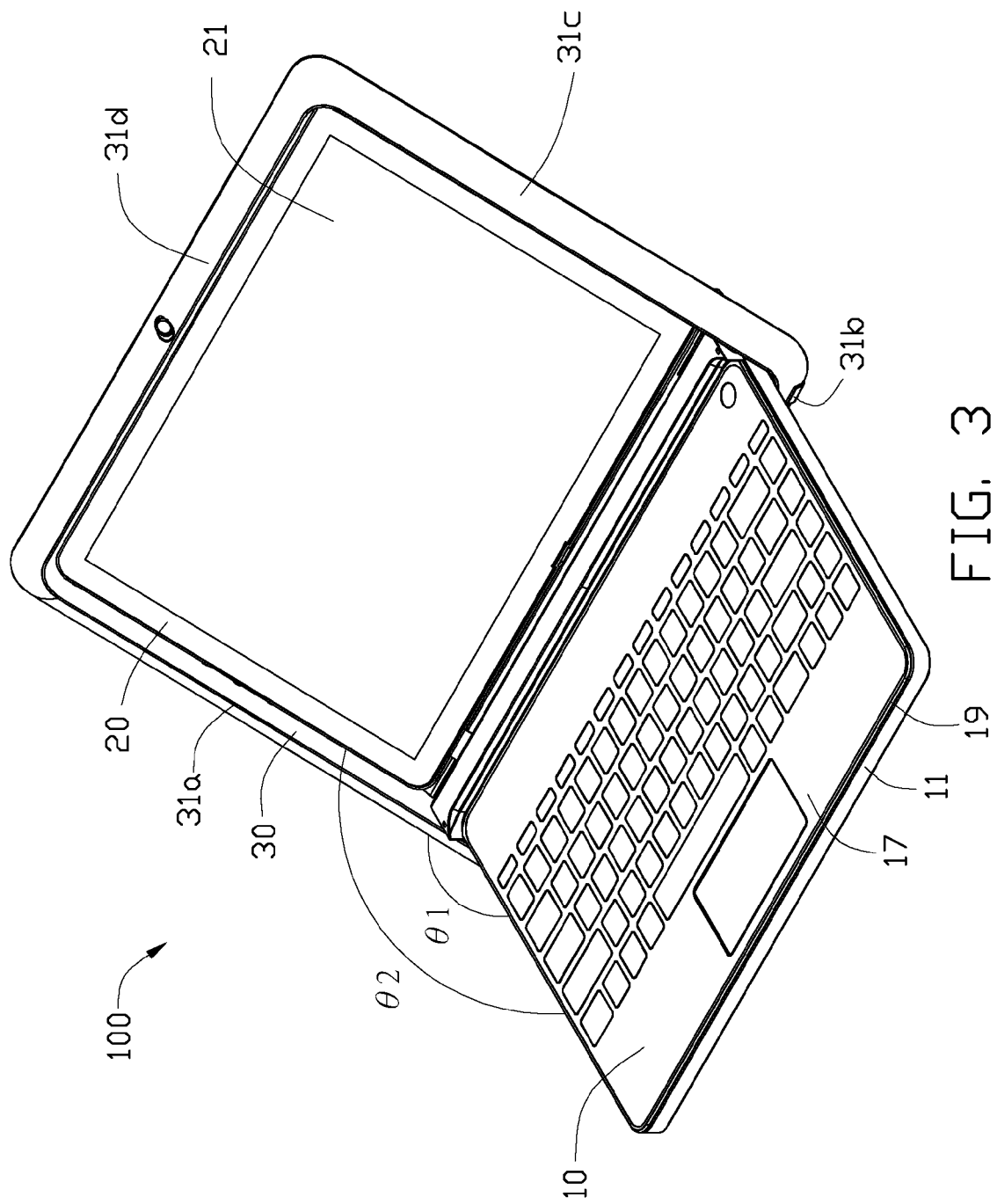
FIG. 3 is an isometric view of the portable electronic device of FIG. 1 in a first open state.

When the portable electronic device 100 is in a first open state as shown in FIG. 3, the portable electronic device 100 can be powered on. The display 20 is in the frame 30. The main body 10 is straddled by the frame 30, and is supported at a fixed angle (not labeled) by the frame 30. A first predetermined angle $\theta_1$ is defined by the main body 10 and the frame 30. A second predetermined angle $\theta_2$ is defined by the main body 10 and the display 20.

Figure 4:
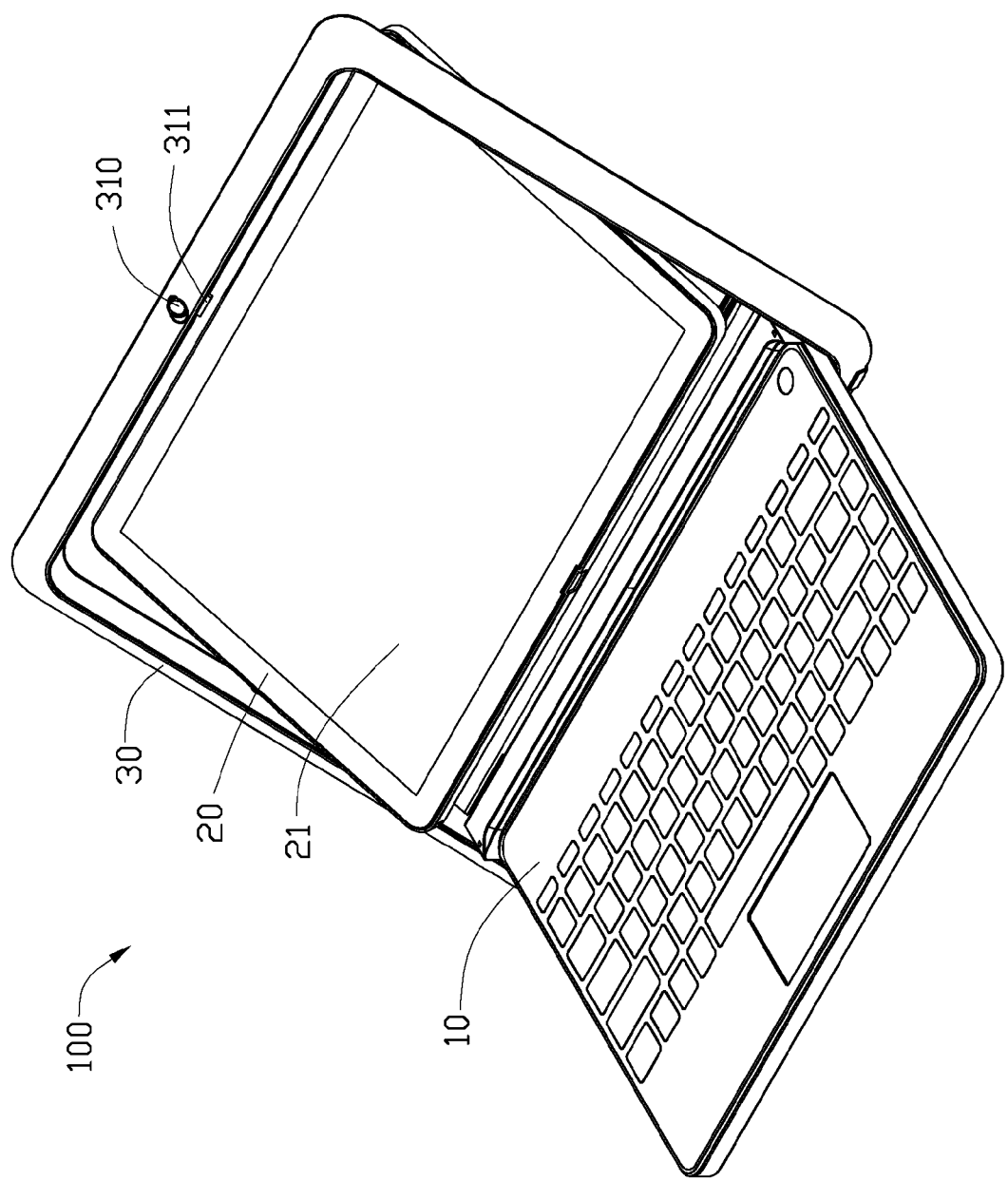
FIG. 4 is similar to FIG. 3, but showing the portable electronic device in a second open state.
Figure 5:
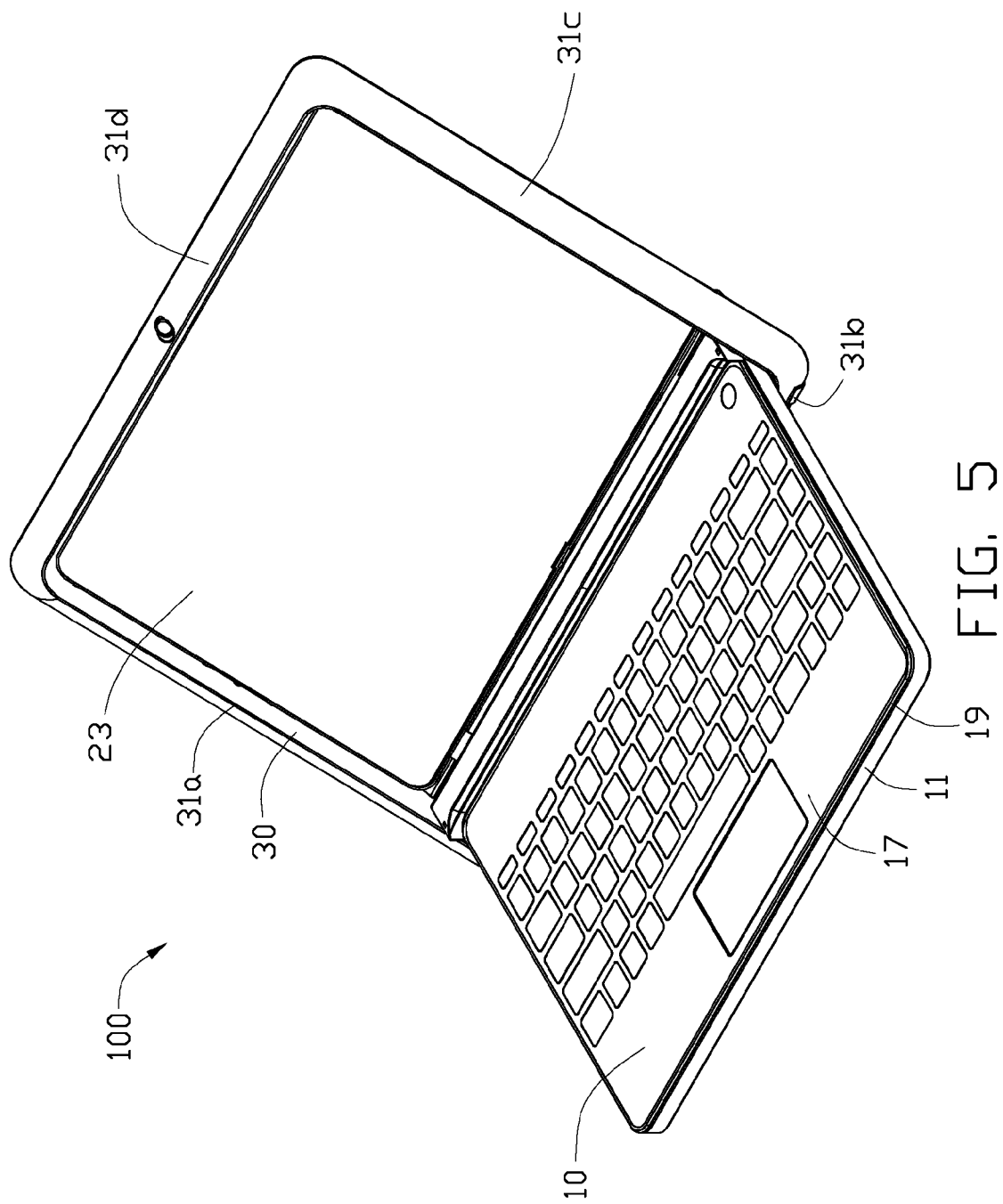
FIG. 5 is similar to FIG. 3, but showing the portable electronic device in yet another open state.

With the portable electronic device 100 in the first open state the display 20 can rotate relative to the frame 30 to adjust the second predetermined angle $\theta_2$ (see FIG. 4). The display 20 can be rotated 180 degrees while being received in the frame 30 clockwise or counterclockwise, for example, see FIG. 5. Thus, the first predetermined angle $\theta_1$ is a constant, and the second predetermined angle $\theta_2$ is variable.

Figure 6:
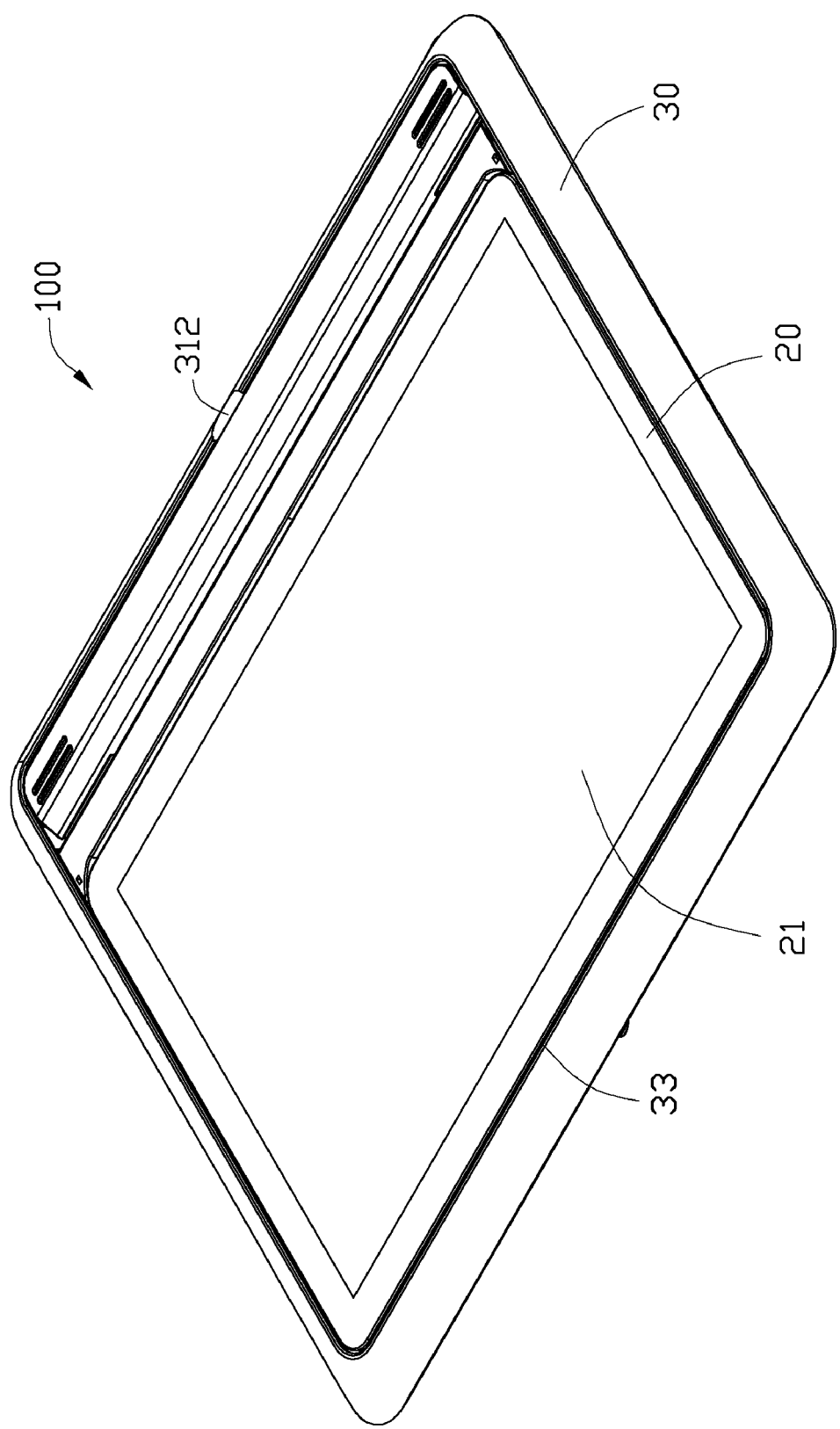
FIG. 6 is similar to FIG. 1, but showing the portable electronic device in a second closed state.

As the display 20 is capable of rotating at an angle of 180 degrees from the main body 10, the display 20 can cover the main body 10 with a carrier 23 (see FIG. 5) of the display 20 facing the housing 19 of the main body 10 (see FIG. 6). The carrier 23 is for carrying the display panel 21 and is opposite to the display panel 21. Thus, portable electronic device 100 is in a second closed state. In this second closed state, the portable electronic device 100 can be operated normally.

Figure 7:
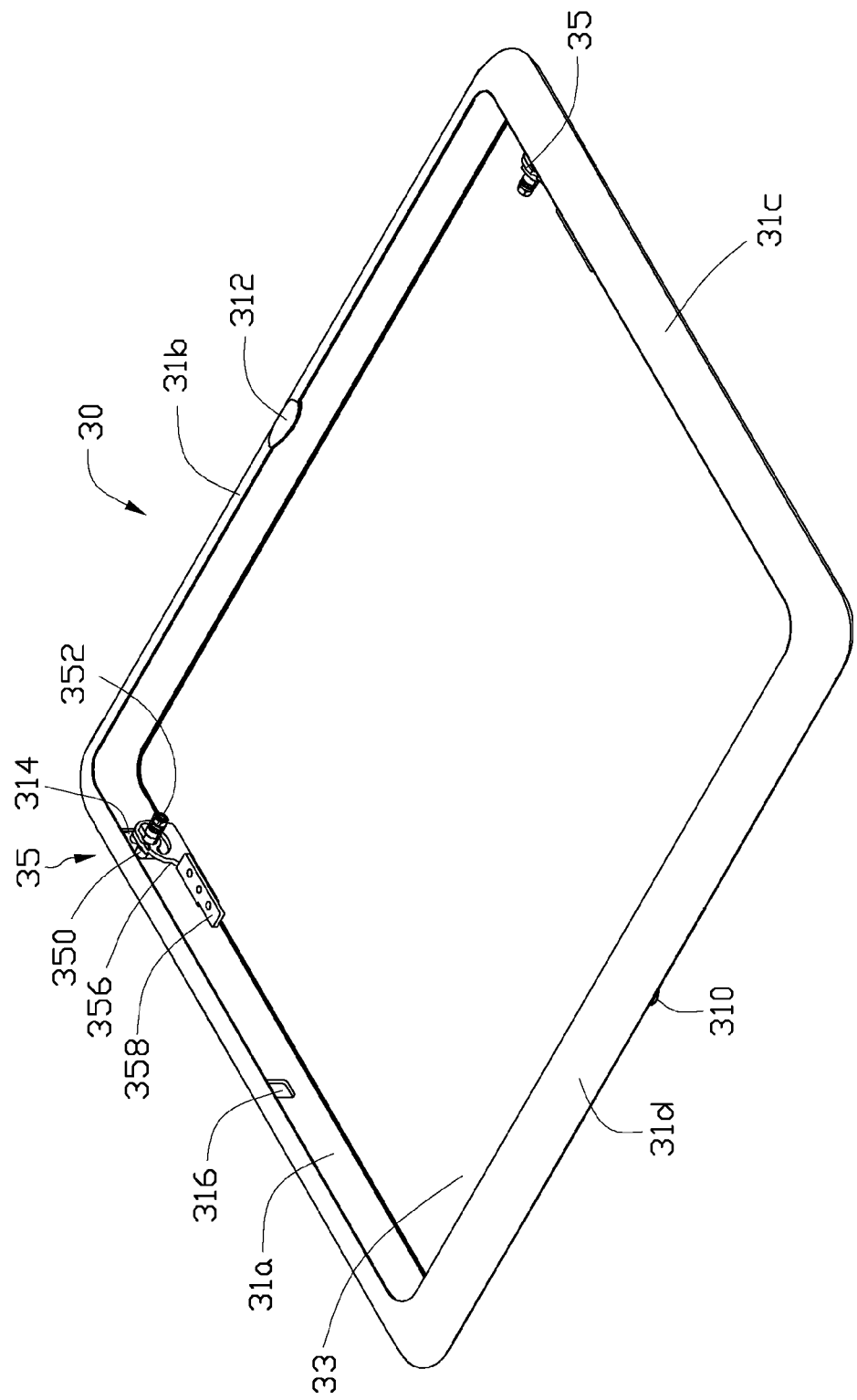
FIG. 7 is a schematic view of the frame of FIG. 1, including a first connecting unit.

Further referring to FIG. 7, the frame 30 is a rectangular structure. In this embodiment, the thickness of the frame 30 is equal to the total thickness of the main body 10 and the display 20. The frame 30 includes a first rim 31a, a second rim 31b, a third rim 31c, a fourth rim 31d, and a pair of first connecting units 35.

The four rims 31a, 31b, 31c, and 31d are perpendicularly interconnected to define an opening 33 through the frame 30. In this embodiment, the four rims 31a, 31b, 31c, and 31d are hollow for allowing wires to run through, thus, the main body 10 and the display 20 can easily get electrical connection. The first rim 31a is substantially parallel to the third rim 31c, and the second rim 31b is substantially parallel to the fourth rim 31d.

Each of the first rim 31a and the third rim 31c defines a blind slot 314 and a blind hole 316. The blind slot 314 and the blind hole 316 communicate with the opening 33. A camera unit 310 is set in the fourth rim 31d. In this embodiment, the camera unit 310 is centered near the halfway point of fourth rim 31d. A latch member 311 (see FIG. 4) is set in the fourth rim 31d, and the latch member 311 is extended into the opening 33.

The opening 33 is defined through the frame 30. When the portable electronic device 100 is in the first or second closed state, the opening 33 receives the main body 10 and the display 20 (see FIGS. 1 and 6). When the portable electronic device 100 is in the first or second open state, the opening 33 only receives the display 20 (see FIGS. 3 and 5), and the display 20 can be rotated 180 degrees in the opening 33 of the frame 30 (see FIG. 4).

Figure 8:
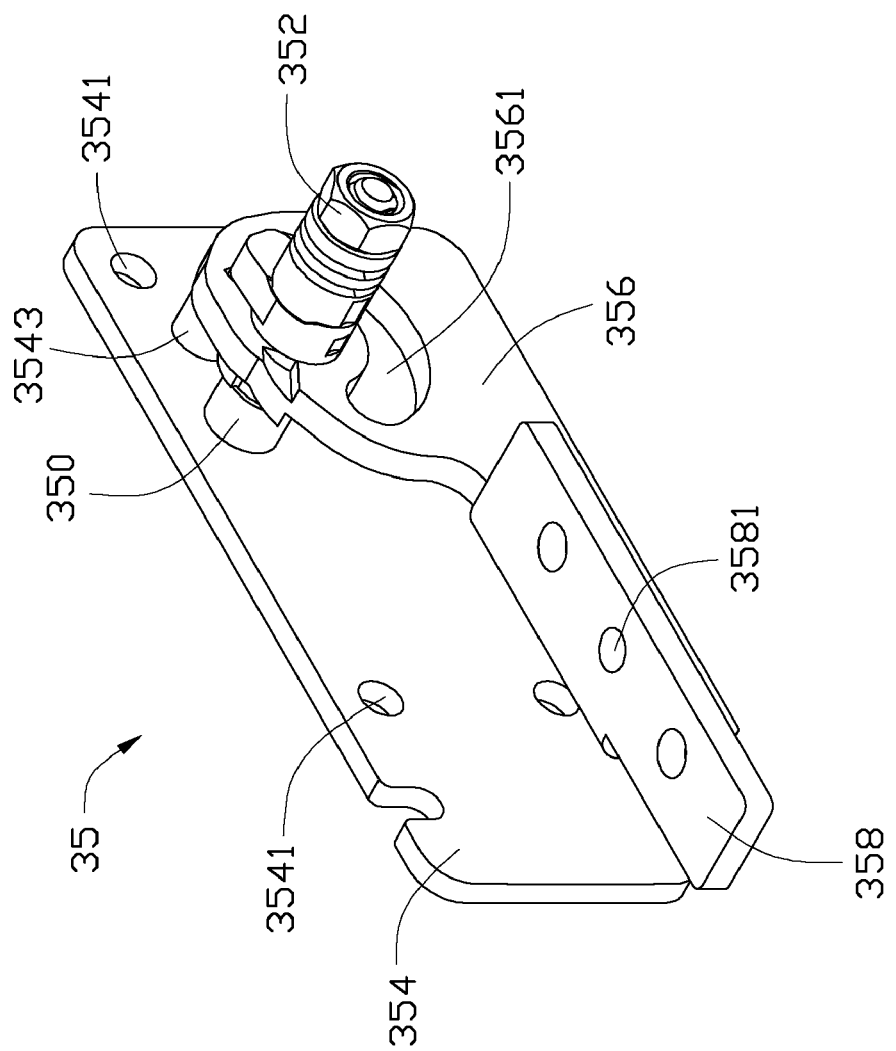
FIG. 8 is a schematic view of the first connecting unit of FIG. 7.

The two first connecting units 35 are received in the first rim 31a, and the third rim 31c respectively. The two first connecting units 35 are opposite and near the second rim 31b. The two first connecting units 35 are configured for rotatablely connecting the main body 10 and the display 20. In this embodiment, the two first connecting units 35 have the same structure, and the first connecting unit 35 set in the first rim 31a is described as below (see FIG. 8).

The first connecting unit 35 includes a rod 350, a nut 352, a first fixing member 354, a second fixing member 356, and a third fixing member 358.

The rod 350 perpendicularly extends from the first fixing member 354 and is through the second fixing member 356. Thus, the rod 350 can be rotated with the second fixing member 356. In other embodiments, the rod 350 can be perpendicularly extending from the first rim 31a, and through the first fixing member 354 and the second fixing member 356. The nut 352 is screwed to the rod 350 to stop the second fixing member 356 from being detached from the rod 350. The nut 352 is further used for adjusting the frictional force between the first fixing member 354 and the second fixing member 356.

The first fixing member 354 defines a plurality of first through holes 3541. The first fixing member 354 includes a protrusion 3543. The protrusion 3543 extends from the first fixing member 354 and is on the same side of the rod 350. In this embodiment, the first fixing member 354 is hidden in the first rim 31a to be esthetically appealing, and the rod 350 and the protrusion 3543 are extending out of the blind slot 314 into the opening 33. In other embodiments, the first fixing member 354 can be fixed to the first rim 31a.

The second fixing member 356 defines a through groove 3561 corresponding to the protrusion 3543. The through groove 3561 is arc-shaped and for receiving and guiding the protrusion 3543. When the second fixing member 356 rotates relative to the rod 350, the protrusion 3543 is moveable in the through groove 3561 and guided by the through groove 3561. In this embodiment, the second fixing member 356 is parallel to the first fixing member 354.

The third fixing member 358 is for connecting the second fixing member 356 to the main body 10. In this embodiment, the third fixing member 358 extends from the second fixing member 356, and each of the second fixing member 356 and the third fixing member 358 defines a plurality of second through holes 3581.

Figure 9:
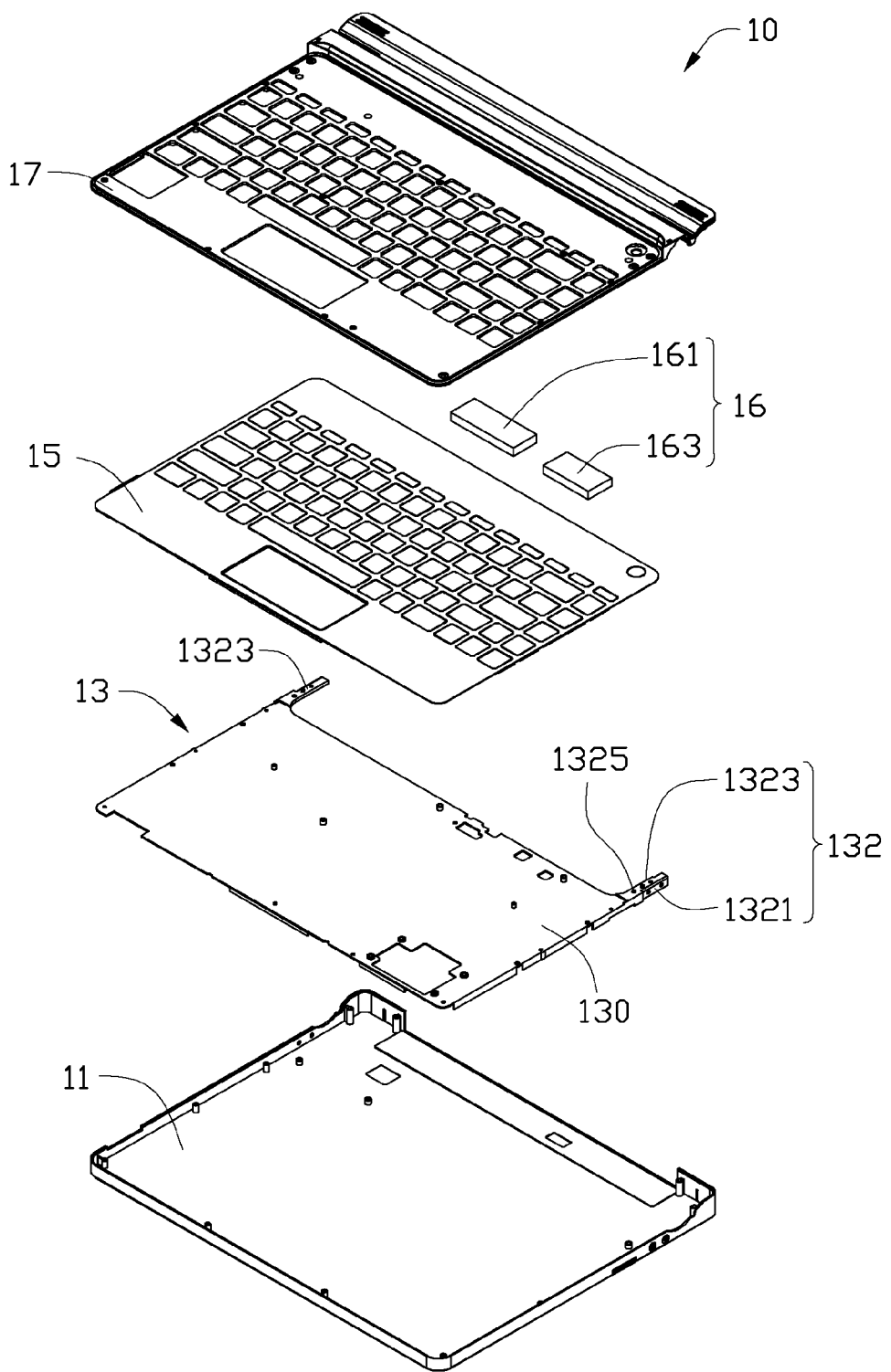
FIG. 9 is an exploded view of the main body of FIG. 1.

Further referring to FIG. 9, the main body 10 includes the housing 19, a supporting board 13, a key module 15, and an assistant module 16.

The housing 19 includes a first casing 11 and a second casing 17 corresponds with the first casing 11. The first casing 11 clamps the second casing 17 to define the housing 19. The housing 19 is for receiving the supporting board 13, the key module 15, and the assistant module 16.

The supporting board 13 is for enforcing the structure of the main body 10. The supporting board 13 is arranged on the second casing 17, and includes a supporting part 130 and two opposite fixing units 132.

The two fixing units 132 extend from the same side of the supporting part 130. The positions of the two fixing units 132 in the supporting board 13 correspond to the two first connecting units 35 in the frame 30, respectively. Each of the two fixing units 132 includes a first fixing part 1321 and a second fixing part 1323. The second fixing part 1323 extends from the supporting part 130. The first fixing part 1321 extends from the second fixing part 1323 and is perpendicular with the supporting part 130. Each of the first fixing part 1321 and the second fixing part 1323 define a plurality of third through holes 1325. The third through holes 1325 of the first fixing part 1321 corresponds with the second through holes 3581 of the second fixing member 356 to receive bolts (not shown) to fix the first fixing part 1321 to the second fixing member 356. The third through holes 1325 of the second fixing part 1323 corresponds with the second through holes 3581 of the third fixing member 358 to receive bolts (not shown) to fix the second fixing part 1323 to the third fixing member 358.

In other embodiments, the first fixing part 1321 and the second fixing part 1323 can be respectively adhered to the second fixing member 356 and the third fixing member 358 with glue.

The third fixing member 358 and the second fixing part 1323 are used for supporting the connection between the first connecting unit 35 and the supporting board 13. In other embodiments, the third fixing member 358 and the second fixing part 1323 can be removed.

The key board 15 is set on the supporting part 130 of the supporting board 13. The key board 15 is used for generating different key signals. The assistant module 16 is set on the second casing 17 through the supporting board 13. The assistant module 16 includes a power unit 161 and an interface unit 163 parallel with the power unit 161. The power unit 161 is for powering the portable electronic device 100.

The interface unit 163 is for connecting other electronic devices, such as a camera, or a printer. The key module 15 and the assistant module 16 are on opposite sides of the pair of the first connecting units 35. Thus, when the portable electronic device 100 is in the first open state (see FIG. 3), the key module 15 and the assistant module 16 is attached through the opening 33 of the frame 30. In this embodiment, the key board 15 includes a circuit board (not labeled) and a key pad (not labeled) electrically mounded on the circuit board. The power unit 161 and the interface unit 163 are electrically connected to the circuit board.

As discussed above, when the two third fixing members 358 rotate relative to the two first fixing members 354, the frame 30, holding the display 20, is driven to rotate relative to the main body 10 to open the portable electronic device 100. Then the main body 10 is straddled by the frame 30, and is supported at the fixed angle by the frame 30. The first predetermined angle θ1 is defined by the main body 10 and the frame 30 is at a viewing angle for the portable electronic device 100. As the main body 10 is inclined to the supporting plane at the fixed angle, which is supplementary to the first predetermined angle θ1, it is easy for the user to input instructions using the key board 15 of the main body 10, and it is easy to facilitate heat dissipation from the main body 10.

Figure 10:
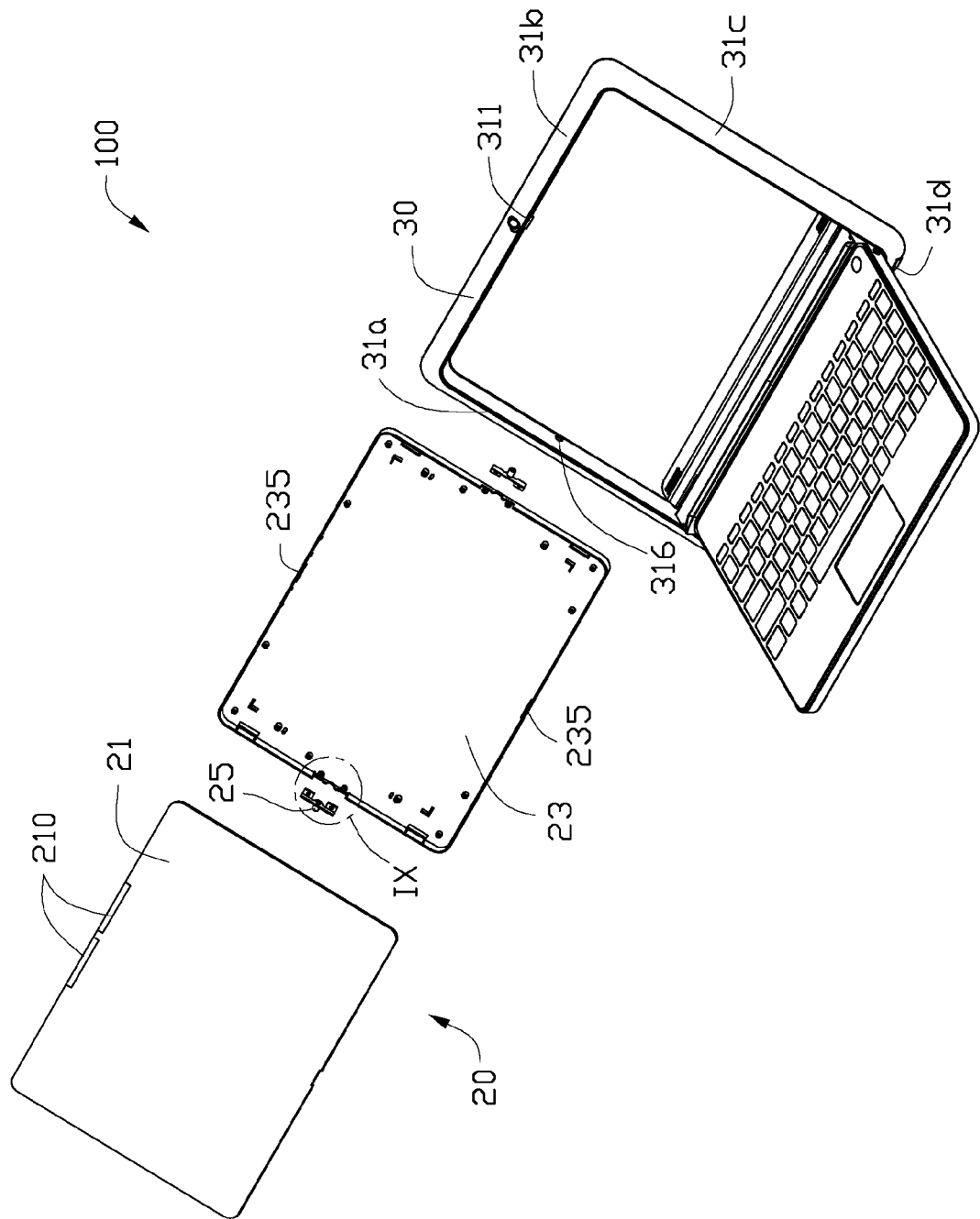
FIG. 10 is an exploded view of the display of FIG. 1.

Further referring to FIG. 10, the display 20 includes the display panel 21, a carrier 23, and two opposite second connecting units 25.

The carrier 23 carries the display panel 21. In order to decrease the vibration of the display panel 21, two elastic members 210 are filled between the carrier 23 and one end of the display panel 21. In this embodiment, the two elastic members 20 may be on the same side of the second rim 31b.

Figure 11:
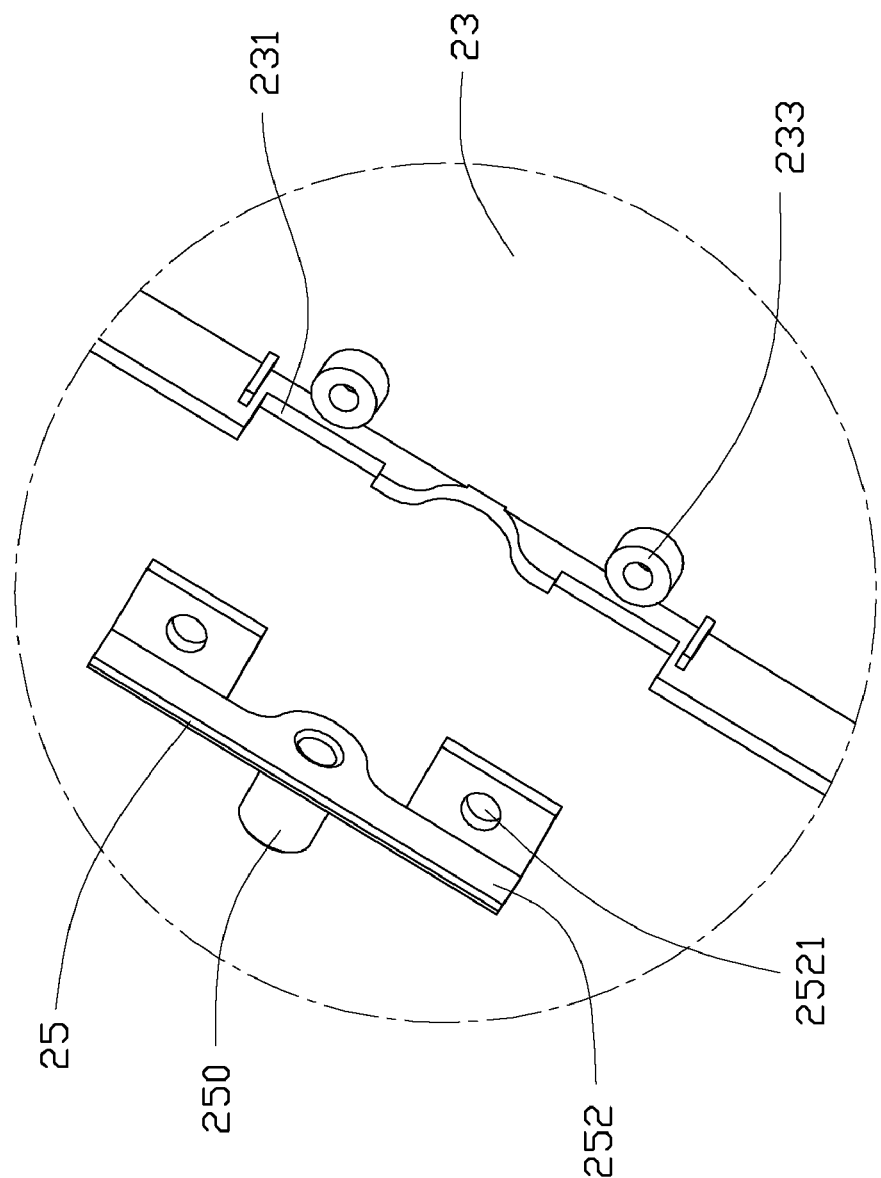
FIG. 11 is a partially isometric view of the section IX of the display of FIG. 10.

Further referring to FIG. 11, the two second connecting units 25 are set on opposite sides of the carrier 23. The two second connecting units 25 are corresponding to the two blind holes 316 of the first rim 31a and the third rim 31c respectively. In this embodiment, the two second connecting units 25 have the same structure, and the second connecting unit 25 set near the first rim 31a is described in detail below.

The second connecting unit 25 includes a shaft 250 and a connecting member 252. The shaft 250 is hollow for receiving wires, thus, the main body 10 and the display 20 can easily be electrically connected through the hollow frame 30 and the hollow shaft 250. One end of the shaft 250 is rotatably received in the blind hole 316, and the other end of the shaft 250 is connected to the connecting member 252. Thus, the second connecting unit 25 can be rotated with the frame 30. The connecting member 252 defines a plurality of fourth through holes 2521.

The carrier 23 defines two opposite through slots 231 and two opposite recesses 235. The two through slots 231 correspond with the two connecting members 252, and are used for receiving the two connecting members 252 respectively. The carrier 23 includes a plurality of receiving housings 233 set on the carrier 23. The receiving housings 233 correspond with the fourth through holes 2521 to receive bolts (not shown) to fix the connecting member 252 to the carrier 23. Thus, when the two connecting members 252 are rotated relative to the frame 30, the carrier 23 carrying the display panel 21 is driven to be rotated relative to the frame 30 between the second open state and the fourth open state. As the display 20 can be rotated in the opening 33 of the frame 30 180 degrees, allowing different viewing angles to be selected by the user.

The two recesses 235 correspond with the latch member 311 of the second rim 31b for receiving the latch member 311 therein. When the display 20 is received in the frame 30, one of the two recesses 235 receives the latch member 311 to decrease the vibration of the display 20.

When the portable electronic device 100 is in the closed state, the display 20 covers the main body 10 with either the display panel 21 or the carrier 23 facing the housing 19 of the main body 10, and the frame 30 receives the main body 10 and the display 20. When the portable electronic device 100 is in the open state, the main body 10 is straddled by the frame 30, and is supported by the frame 30 to define the first predetermined angle θ1 between the main body 10 and the frame 30.

In this embodiment, the display panel 21 is a touch sensitive panel. Thus, the display 20 allows a user to operate the portable electronic device 100 in the second closed sate with touch inputs on the touch sensitive panel.

As discussed above, the frame 30, holding the display 20, is capable of being rotated relative to the main body 10 in the open state. As the first predetermined angle θ1 defined by the main body 10 and the frame 30 is a constant, the frame 30 with the display 20 is steady relative to the main body 10. When the display 20 rotates relative to the frame 30, the second predetermined angle θ2 is defined by the display 20 and the main body 10 can be adjusted to different viewing angles. Thus, it is a useful utility for the portable electronic device 100 that enables it to be viewed at multiple angles.

In other embodiments, the number of the first connecting units 35 can be one, and the number of the second connecting units 25 can be one.

In other embodiments, the portable electronic device 100 can be a media player, a learning machine, or a mobile phone.

It is to be understood, however, that even though numerous embodiments have been described with reference to particular embodiments, but the present disclosure is not limited to the particular embodiments described and exemplified, and the embodiments are capable of considerable variation and modification without departure from the scope of the appended claims.

What is claimed is:

1. A portable electronic device, comprising:
a main body comprising a housing;
a display electrically connected to the main body, the display comprising a display panel and a carrier for carrying the display panel; and
a frame for connecting with the main body and the display;
wherein when the portable electronic device is in the open state, the main body is straddled by the frame and is supported by the frame to define a first predetermined angle between the main body and the frame, the frame comprises four rims and a first connecting unit, the four rims are substantially perpendicularly interconnected to define an opening through the frame, the opening is for receiving the main body and the display, the first connecting unit is set in one of the four rims and extends into the opening, the first connecting unit is for rotatably connecting the main body to the frame;
wherein the first connecting unit comprises a rod, a first fixing member, and a second fixing member, the rod is perpendicularly fixed on the first fixing member and is through the second fixing member to be rotatable with the second fixing member, the first fixing member is fixed to the frame, the second fixing member is fixed to the main body;
wherein the main body comprises a supporting board for enforcing the structure of the main body, the supporting board is rotatably for connecting to the first connecting unit;
wherein the supporting board comprises a supporting part and a first fixing part corresponding to the second fixing member, the first fixing part extends from the supporting part to be connected to the second fixing member;
wherein the first connecting unit further comprises a third fixing member perpendicularly extending from the second fixing member, the supporting board further comprises a second fixing part corresponding to the third fixing member, the second fixing part perpendicularly extends from the second fixing part to be connected to the third fixing member, the third fixing member and the second fixing part are for enforcing the connection between the first connecting unit and the supporting board.

2. The portable electronic device of claim 1, wherein when the portable electronic device is in the open state, the main body is inclined to facilitate heat dissipated from the main body.

3. The portable electronic device of claim 1, wherein when the portable electronic device is in the open state, the display is capable of being rotated relative to the frame to adjust a second predetermined angle defined by the main body and the display.

4. The portable electronic device of claim 3, wherein the display comprises a touch sensitive panel as the display panel, when the portable electronic device in the closed state, the display covers the main body with the carrier of the display facing the housing of the main body, allowing a user to operate the portable electronic device with touch inputs.

5. The portable electronic device of claim 1, wherein the first fixing member comprises a protrusion, the second fixing member defines a through groove corresponding to the protrusion, the through groove is for receiving and guiding the protrusion.

6. The portable electronic device of claim 5, wherein the through groove is arc-shaped.

* * * * *